(12) United States Patent
Mandeltort

(10) Patent No.: US 9,795,252 B1
(45) Date of Patent: Oct. 24, 2017

(54) ROLLER GRILL COVER

(71) Applicants: Eby-Brown Company, LLC, Naperville, IL (US); Mathew Mandeltort, Naperville, IL (US)

(72) Inventor: Mathew Mandeltort, Naperville, IL (US)

(73) Assignee: EBY-BROWN COMPANY, LLC, Naperville, IL (US)

( * ) Notice: Subject to any disclaimer, the term of this patent is extended or adjusted under 35 U.S.C. 154(b) by 64 days.

(21) Appl. No.: 14/876,949

(22) Filed: Oct. 7, 2015

Related U.S. Application Data

(60) Provisional application No. 62/061,256, filed on Oct. 8, 2014.

(51) Int. Cl.
*B65D 25/28* (2006.01)
*A47J 37/07* (2006.01)

(52) U.S. Cl.
CPC .................. *A47J 37/0786* (2013.01)

(58) Field of Classification Search
CPC ....... A47J 36/06; A47J 37/048; A47J 37/0635
USPC ...................................... 220/212.5
See application file for complete search history.

(56) References Cited

U.S. PATENT DOCUMENTS

| | | | |
|---|---|---|---|
| 2,185,979 A | 8/1939 | Dumas | |
| 6,393,971 B1 * | 5/2002 | Hunot | A47J 36/06 219/214 |
| 7,520,211 B2 * | 4/2009 | Hunot | A47J 36/06 99/341 |
| 8,112,920 B2 | 2/2012 | Fenton | |
| 8,844,755 B2 * | 9/2014 | Sarnoff | A47J 27/00 220/573.1 |
| 2004/0189156 A1 * | 9/2004 | Pearlman | A47F 10/06 312/137 |
| 2006/0037599 A1 * | 2/2006 | Hill | A47J 36/02 126/25 R |
| 2006/0201959 A1 * | 9/2006 | Hornbeck | A47J 36/06 220/841 |
| 2011/0262113 A1 * | 10/2011 | Home | A47J 37/0635 392/307 |
| 2013/0183423 A1 * | 7/2013 | Todys | A47J 39/00 426/418 |

OTHER PUBLICATIONS

RG Series Hot Dog Roller Grill flyer, published by Avantco Equipment of Lancaster, Pennsylvania, at least as early as Oct. 1, 2014.

* cited by examiner

*Primary Examiner* — Shawn M Braden
(74) *Attorney, Agent, or Firm* — Patzik, Frank & Samotny Ltd.

(57) ABSTRACT

A roller grill cover having: an elongated body that extends over the length of the grill rollers and which includes a pair of arms for engaging the top of the sides of the roller grill to provide stability for the cover; a front flange is angled downwardly from the front end of the body to limit a consumer's view of the rollers (and their contents) underneath and behind the flange. The body may include a rear flange that extends upwardly to provide access to the rollers behind the front flange for product placement and removal. The front flange may include a mirror finish or other reflective materials to allow the food items on the front rollers to be reflected off of the flange to give the visual appearance that there are more food items then actually shown.

18 Claims, 8 Drawing Sheets

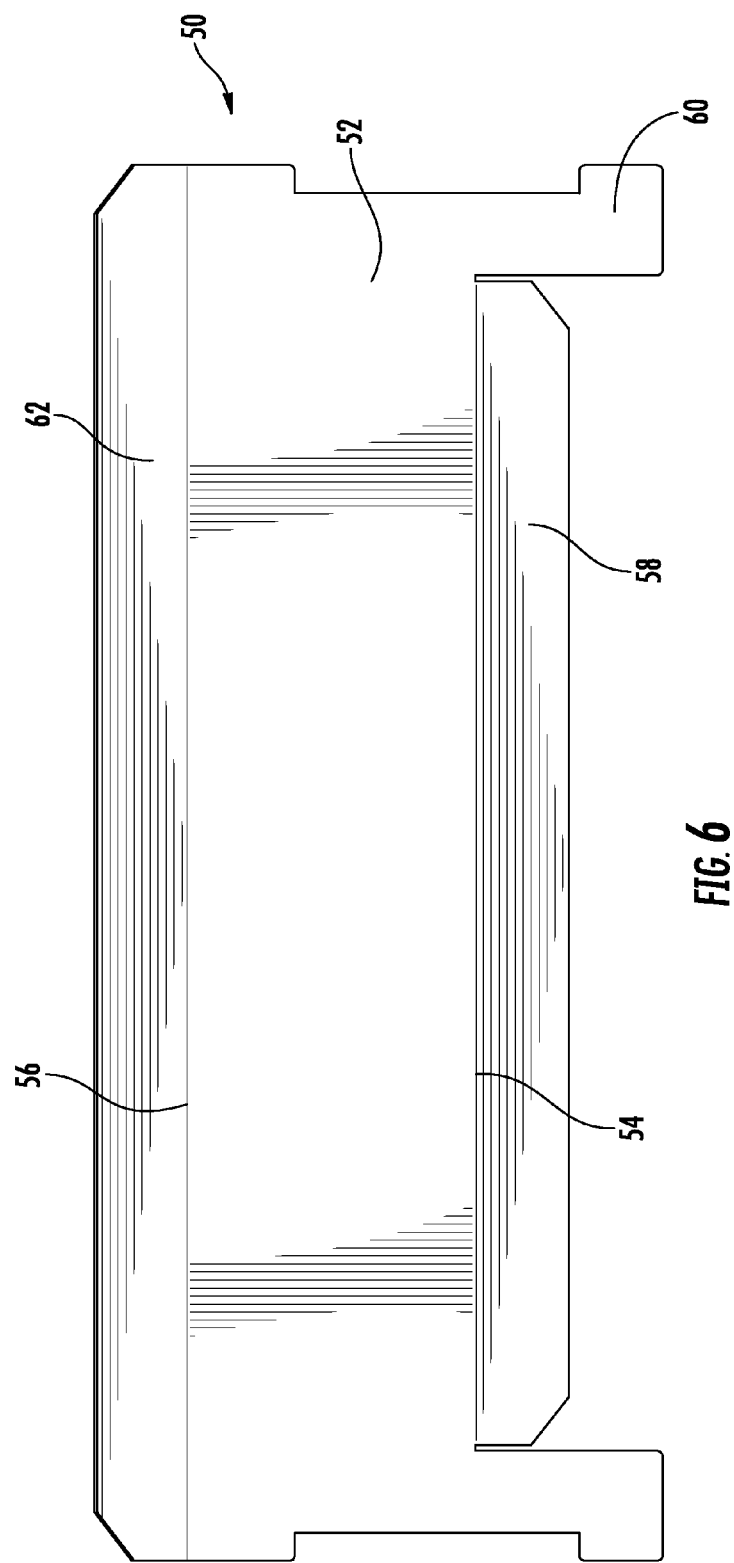

ROLLER GRILL COVER

This application claims the benefit of U.S. provisional patent application Ser. No. 62/061,256, filed Oct. 8, 2014, the entirety of which is hereby incorporated by reference.

FIELD OF THE INVENTION

This invention relates generally to a cover for use with a roller grill, and more specifically, to a cover that helps reduce food waste and the amount of time that food products remain on the roller grill before they are sold or disposed of.

BACKGROUND OF THE INVENTION

Roller grills utilize a plurality of heated tubes that permit elongated food items such as, but not limited to, hot dogs, bratwursts, corndogs and the like to be rotated or turned to allow for the heat to be evenly applied to the food item. Roller grills are commonly found in a number of places including convenience stores and gas stations.

In use, food products such as hot dogs are placed on the rollers and usually covered with a transparent lid to allow consumers to see what food items are available for purchase. In operation, a consumer views the products and, when a selection is made, opens the transparent lid or access door and then reaches in to grab the hot dog or other food item with tongs or other devices.

Based on consumer practices, when only a single or a small number of items remain, a common instinctual reaction for consumers is to think that the food item may have been displayed for an extended period of time and therefore elect not to purchase it. Accordingly, consumers are more apt to purchase food items from a roller grill when there are more items displayed for sale. Furthermore, certain operations of convenience stores and the like where a roller grill is in use are very reluctant to dispose of any food, regardless of how long it has been on the roller. Accordingly, the more food items on the roller grill that can be sold quickly, the less waste there will be and the better off consumers will be.

Under food guidelines and regulations, such food items must be replaced when unsold after certain periods of time (typically at the end of the day). Because of the perception that an individually displayed food item (or a few food items) may be old, there are often hotdogs and other food items left over at the end of the day. This creates inefficiencies and waste as the owners therefore have to throw away or otherwise dispose of food products that are left over after the regulated time period.

BRIEF SUMMARY OF THE INVENTION

The present invention comprises a cover for a roller grill that includes an elongated body that is sized to extend over the length of the grill rollers. An arm extends forward from each of the sides of the body for engaging the top of the sides of the roller grill to provide stability for the cover. A front flange is angled downwardly from the front end of the body so that when placed on the roller grill, the end of the flange is preferably close to the height of the rollers to limit a consumer's view of the rollers (and their contents) underneath and behind the flange. The body may include a rear flange that extends upwardly to provide access to the rollers behind the front flange for product placement and removal. A pair of side walls extends downwardly from the side of the rear flange to cover the gap under the rear flange and limit the ability to view the rear rollers.

The cover may be made from a variety of materials that are food safe, including stainless steel. The front flange may include a mirror finish or other reflective materials to allow the food items on the front rollers to be reflected off of the flange to give the visual appearance that there are more food items then actually shown.

Accordingly, it is an object of the present invention to provide a cover for a roller grill that optimizes food product placement while reducing food waste.

It is another object of the present invention to provide a cover for a roller grill that enhances the perceived freshness of the displayed food items by obscuring unused grill rollers.

It is yet another object of the present invention to provide a cover for a roller grill that increases perceived product presence.

It is yet another object of the present invention to provide a cover for a roller grill that increases how quickly such food items are purchased while reducing food waste.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

FIG. 6 is a top plan view of another embodiment of the roller grill cover of the present invention.

DETAILED DESCRIPTION OF THE INVENTION

Figure 1:
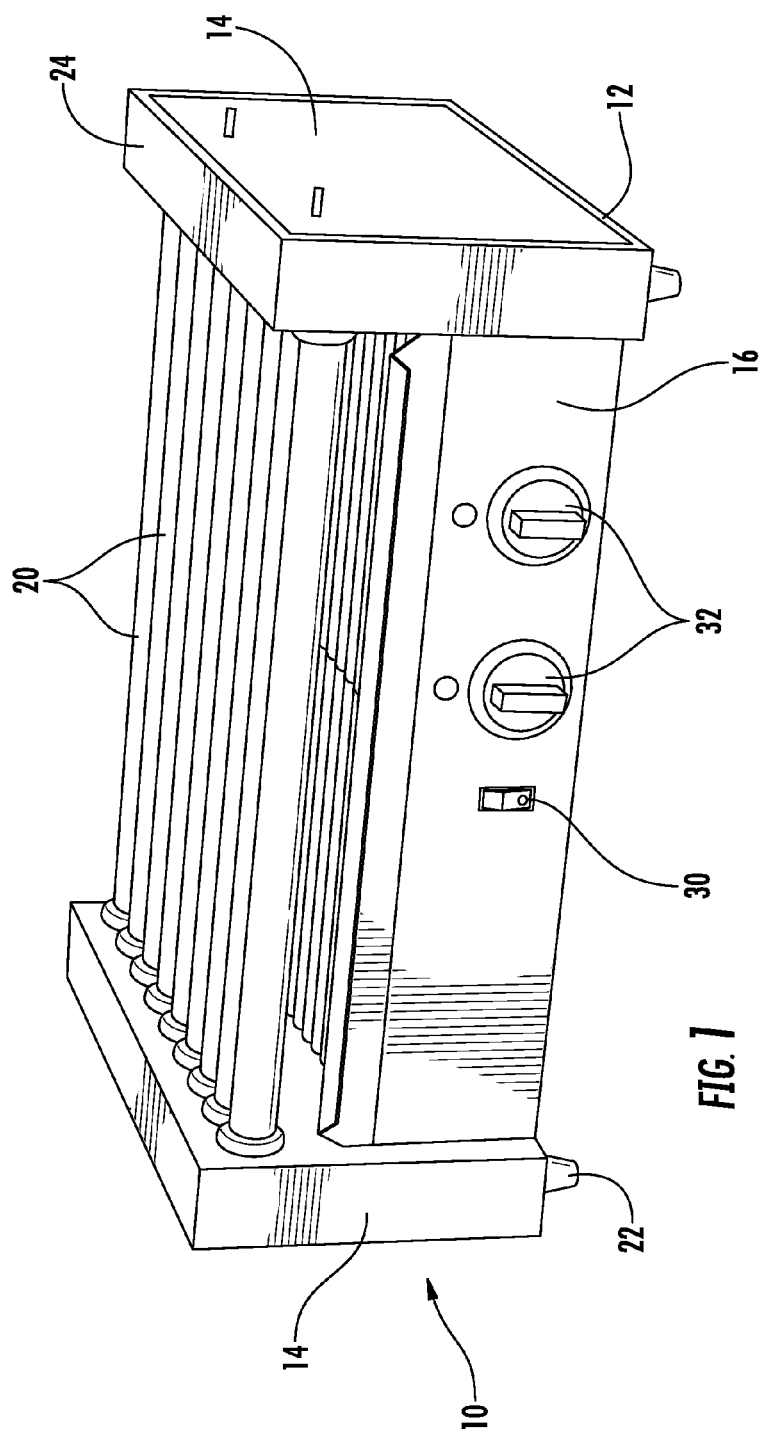
FIG. 1 is a front perspective view of a prior art roller grill.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Referring now to FIG. 1, an example of a roller grill 10 is shown. The roller grill includes a housing 10 having a front wall 16, a rear wall 18 (not shown in FIG. 1), and a pair of side walls 14. The side walls 14 extend above the front wall 16 to accommodate a plurality of rollers 20 that extend between and are connected to or positioned between the inside surfaces of the side walls 14. A power or on/off switch 30 may be utilized to selectively turn the roller grill 10 on and off. Temperature control dials 32 are shown on the front wall to allow a user to manually set the temperature of the roller grills to heat the food products that are placed thereon. Multiple control dials 32 may be utilized to selectively provide a different amount of heat to different rollers 20 of the roller grill 10 (e.g., front and rear). A power cord (not shown) extends from the roller grill 10 to allow the roller grill to be connected to an electrical outlet or other external power source. Leg members 22 may be utilized underneath the walls to raise the housing 12 of the roller grill 10 off of the surface it is placed on to prevent damage to the surface from the heat generated from the roller grill 10. Each of the side walls 14 is shown as having a flat top surface 24. Examples of roller grills and their heating components are shown in U.S. Pat. Nos. 6,393,971 and 6,782,802 and US Patent Publication No. 2013/0104747, the entirety of which are hereby incorporated by reference.

Figure 2:
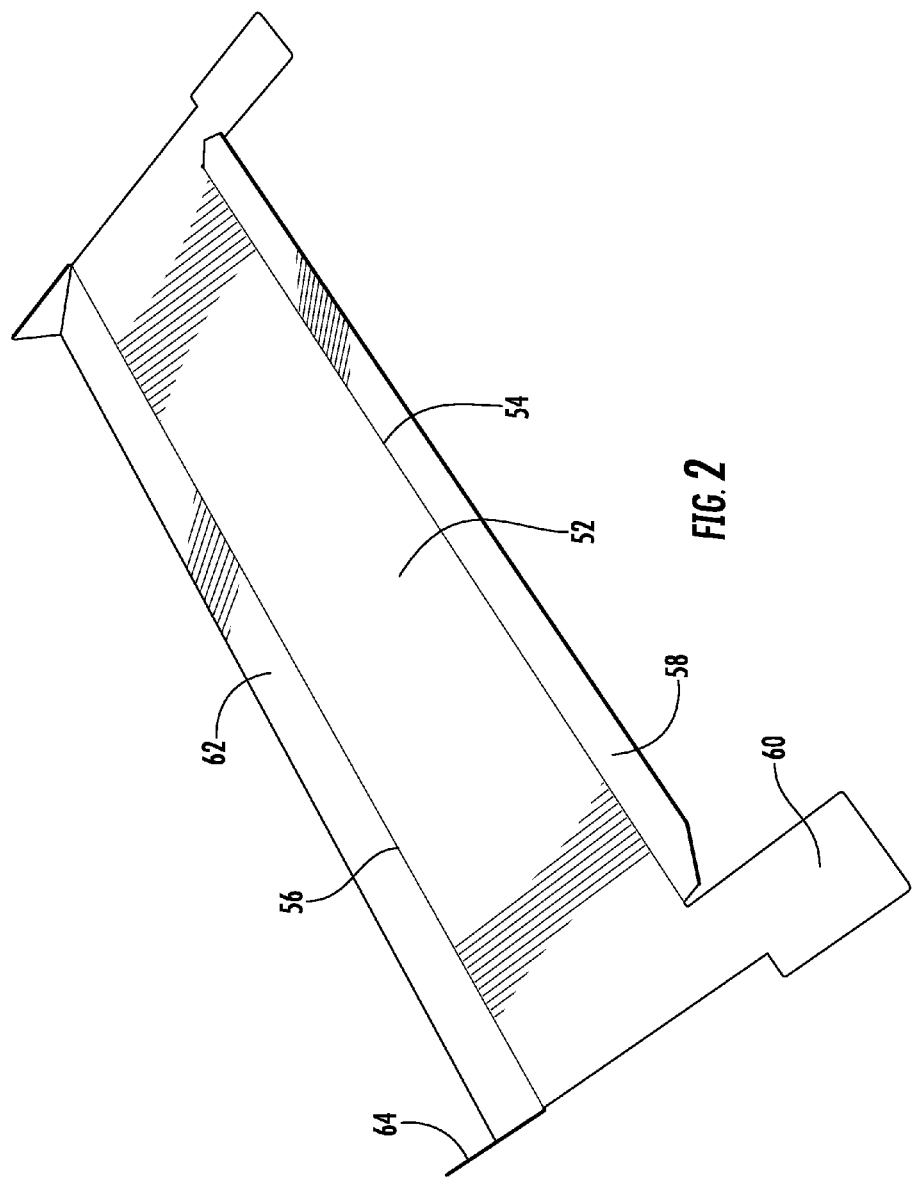
FIG. 2 is a bottom perspective view of one embodiment of roller grill cover of the present invention.
Figure 3:
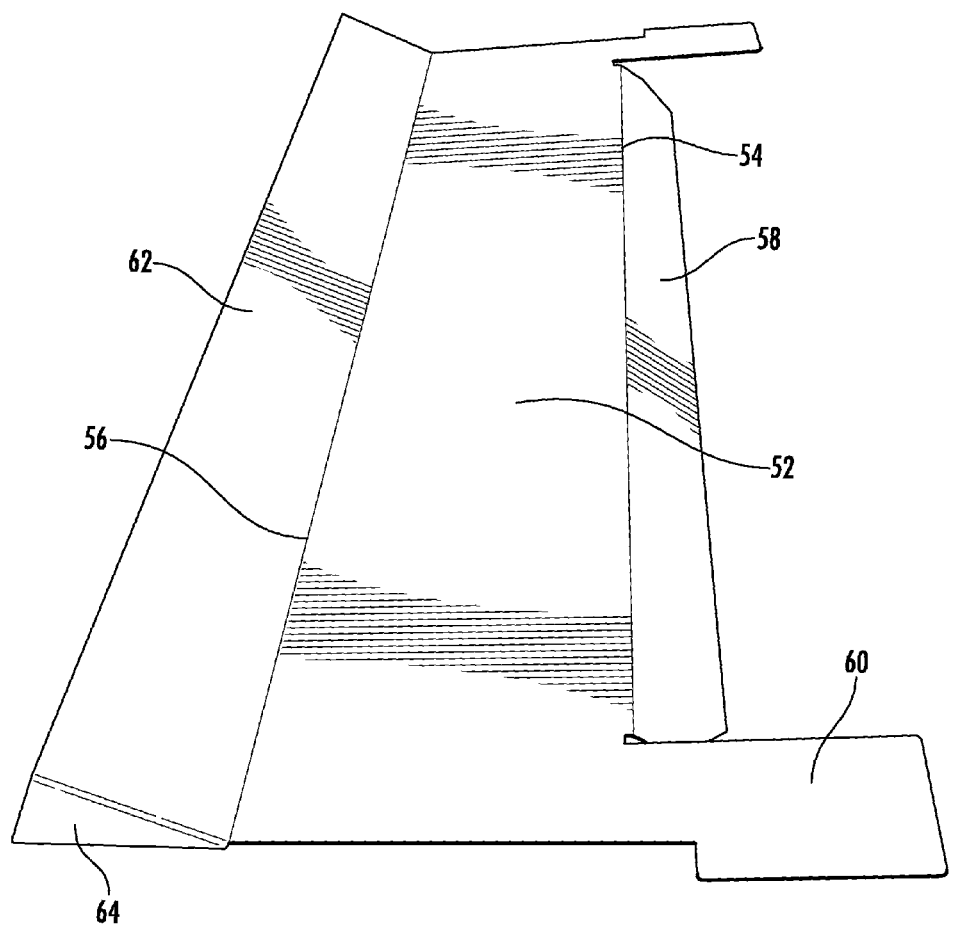
FIG. 3 is a top perspective view of the roller grill cover shown in FIG. 2.

Referring now to FIGS. 2 and 3, one embodiment of a roller grill cover, generally designated by the numeral 50, is shown having: a main body 52 having a front end 54 and a rear end 56; a front flange 58 downwardly extending from the front end 54 of the main body 52; a pair of arms 60 extending forward from the sides of the front end 54 of the main body 52; a rear flange 62 extending upwardly from the rear end 56 of the main body 52; and a pair of side wall members 64 extending downwardly from the sides of the rear flange 62.

The roller grill cover may be made from a number of materials that promote food safety, including, but not limited to stainless steel. In one embodiment, at least the front flange 58 includes a mirrored or reflective finish or coating that allows the food items displayed on the front rollers 20 of the roller grill 10 in front of the front flange 58 to be reflected off of the front flange 58 thereby creating the perception in the consumer's mind that there may be more food items than actually shown. It is also appreciated that the roller grill cover 50, or parts thereof, may be made from a magnetic material, or otherwise include a magnetic coating, to allow magnetic objects to be attached thereto.

The front flange 58 is preferably sized so that it at least substantially extends over the length of the rollers 20 to prevent or limit a consumer's ability to see the rollers 20 located behind the front flange 58 and whether any food items are located behind. By limiting the ability of a consumer to see whether there are food items behind the front flange 58, it enhances the perceived freshness of those food items on display because a consumer is likely to perceive that there are additional food items being warmed behind the front flange 58 and under the body 52 of the cover. This acts to optimize food product placement while reducing the amount of food items that need to be disposed of. In one embodiment, the front flange 58 of the roller grill cover 50 may extend downwardly at 40 degrees. It is appreciated that the size and angle of the front flange may vary depending upon the particular size and configuration of the roller grill that it is used on or in connection with.

The arms 60 extend outwardly from the sides of the front end 54 of the body to further engage the top surface 24 of the sides 14 of the roller grill 10 to provide additional stability. The arms 60, as shown in the figures, may extend beyond the sides of the body 52 to provide for an additional contact surfaces and support for the cover 50.

Figure 4:
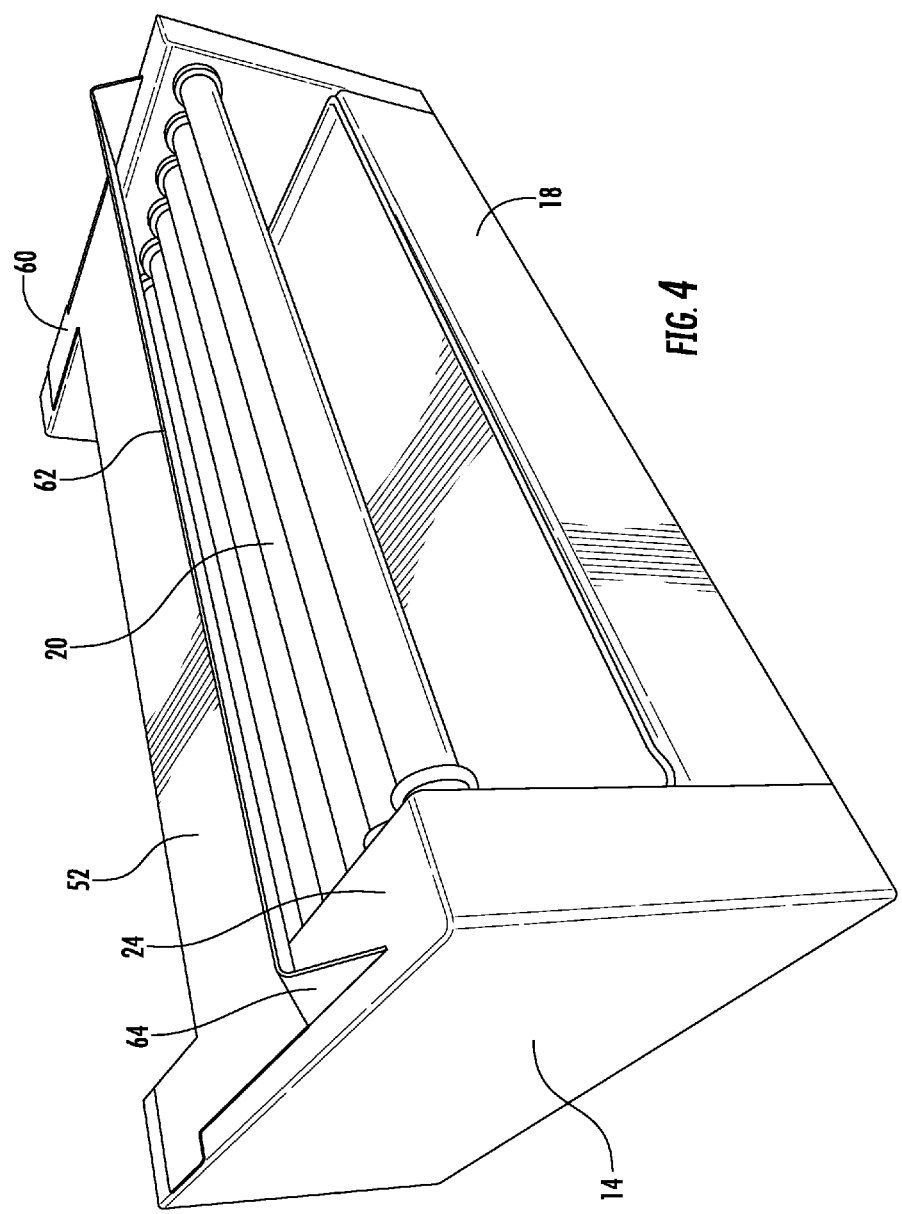
FIG. 4 is a rear perspective view of the roller grill cover shown in FIG. 2 used in connection with a roller grill.
Figure 5:
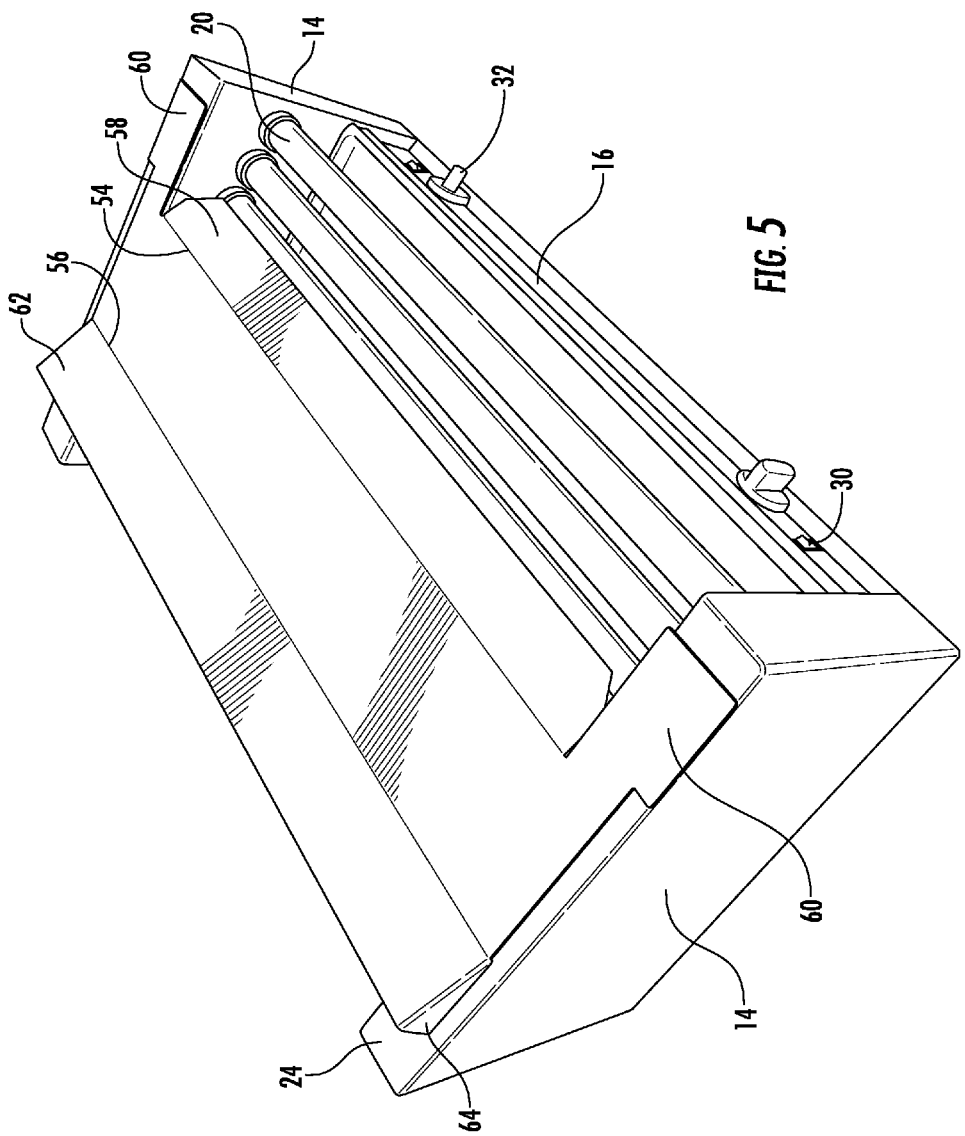
FIG. 5 is a front perspective view of the roller grill cover shown in FIG. 2 used in connection with a roller grill.
Figure 7A:
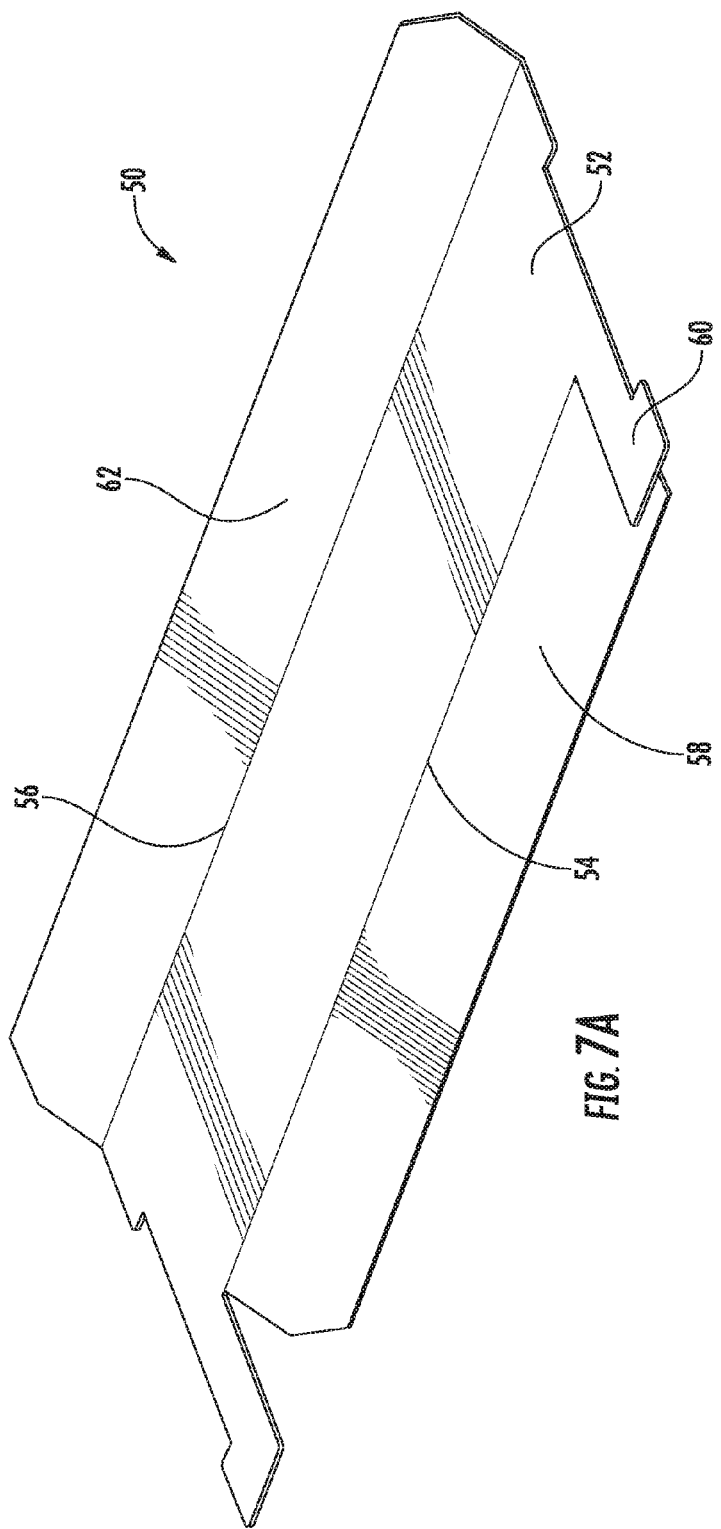
FIG. 7A is a perspective view of the roller grill cover shown in FIG. 6.
Figure 7B:
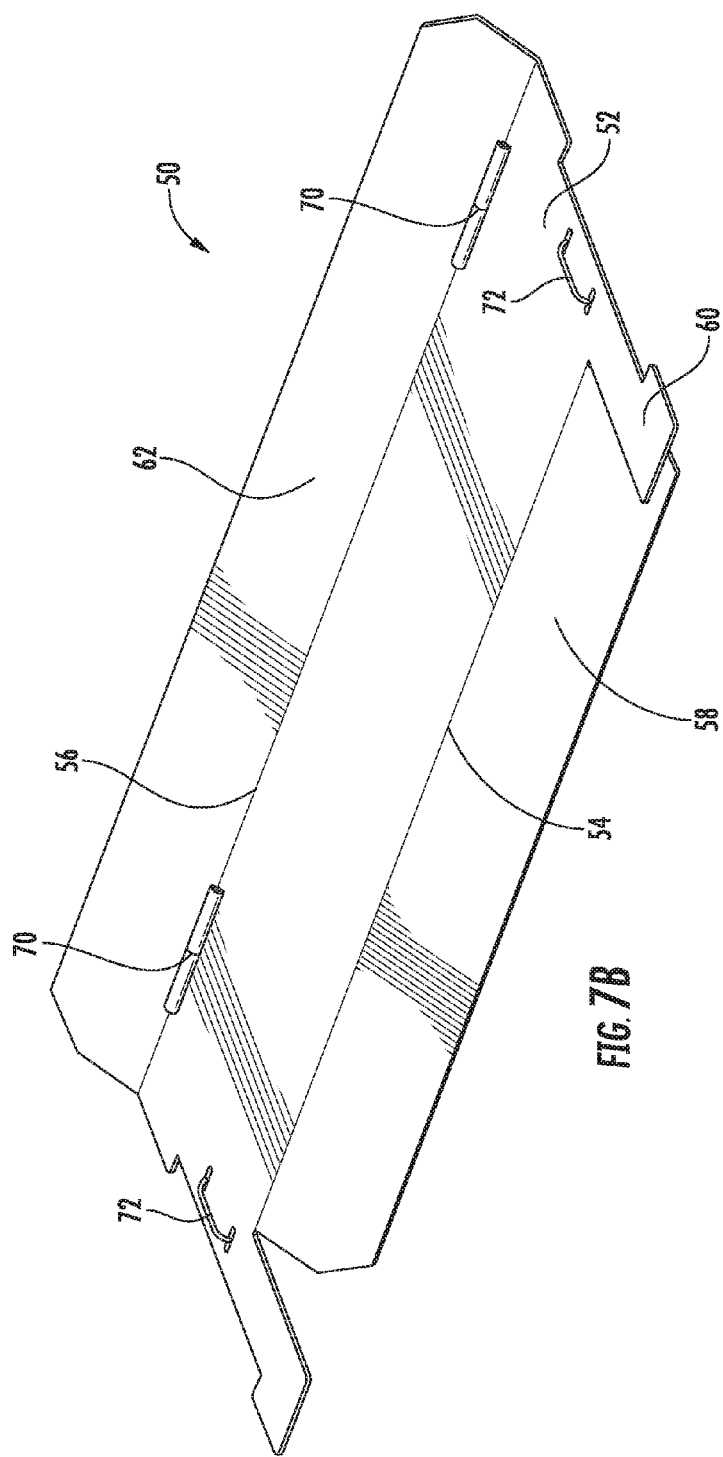
FIG. 7B is a perspective view of another embodiment of the roller grill cover having hinges and handles.

The rear flange 62 of the roller grill cover 50 preferably extends upwardly so that, as shown in FIG. 4, the operator may readily view and access the roller located behind the front flange 58 to see how many food items are left and easily move or supplement those food items. While the flange may include side walls 54 that extend downwardly from the ends of the rear flange to provide additional support and limit the ability to see behind the flange from the front, it is appreciated that, as shown in FIGS. 6 and 7, the roller grill cover may not include side walls and not depart from the scope of the present invention. Referring again to FIGS. 6, 7A and 7B, the sides of the body 52 near the rear end 56 may also extend beyond the sides of the body 52 to provide for additional contact surface and support. One or more hinges 70 or other connecting devices permitting rotation may be utilized to connect the rear flange 62 to the rear end 56 of the body 52 to permit it to be rotated upwardly to facilitate access to the rollers thereunder.

Handles 72 or other members providing a grasping surface may be utilized on the top of the roller grill cover 50 to facilitate placement and removal of the roller grill cover 50 from the roller grill 10. It is appreciated that any such members may be made from a non-conductive material or include a coating or covering that is non-conductive to prevent them from becoming too hot and hurting anybody attempting to use the members to remove the cover from a roller grill that is or was in use.

In operation, the roller grill cover 50 is placed on top of a roller grill 10 using the handles or other members if available, or by grasping the end surfaces of the roller grill cover 50. The roller grill cover 50 is placed so that the sides of the body 52 and the arms 62 are located or substantially located on the top surface 24 of the sides 14 of the roller grill 10. The roller grill cover 50 is positioned so that a selected number of rollers 20 are uncovered to allow food products to be placed thereon for selection by consumers. Additional food items may be placed on the rollers 20 behind the front flange 58 to keep warm for replacing those food items that are purchased. Additional food items may be placed on the rollers 20 behind the front flange 58 as items are purchased by placing them under the rear flange 62 and/or body 52. If the rear flange 62 is rotationally connected to the body 52, it may be rotated up to facilitate placement of the food items thereon. Once placed, it may be rotated down to cover the food items located thereunder.

It is further appreciated that the cover of the present invention may include digital displays to permit information and/or graphics to be displayed thereon.

It will be understood that modifications and variations may be effected without departing from the spirit and scope of the present invention. It will be appreciated that the present disclosure is intended as an exemplification of the invention and is not intended to limit the invention to the specific embodiment illustrated and described. The disclosure is intended to cover, by the appended claims, all such modifications as fall within the scope of the claims.

What is claimed is:

1. A cover for a roller grill assembly, the roller grill assembly having a housing comprising a main body having a front and a back, a length extending from the front to the back, and a pair of side walls having upper surfaces thereon, and a heating area comprising a plurality of spaced apart tubular members rotatably mounted within the housing at a vertical position beneath the upper surfaces of the side walls, the roller grill assembly allowing for food placed between adjacent tubular members to be heated, the cover comprising:

a body sized to extend over the tubular members and rest on the upper surfaces of the side walls, the body having a main section that extends over and conceals a portion of the heating area and a length less than the length of the housing, a front end, a rear end and a pair of sides; and a front flange extending and angling downwardly from the main section of the body at the front end, the front flange extending between the side walls of the housing and separating the heating area of the roller grill assembly into a front section that is visible from the front of the housing and a rear section that is substantially concealed from the front of the housing by the main section and the front flange.

2. The cover of claim 1 which further comprises a rear flange extending upwardly from the rear end of the body.

3. The cover of claim 2 wherein the rear flange is hingedly attached to the rear end of the body.

4. The cover of claim 2 wherein the rear flange comprises a first end and a second end and which further comprises rear flange side walls extending downwardly from the first and second end.

5. The cover of claim 1 wherein the cover is made from stainless steel.

6. The cover of claim 1 wherein the front flange includes a reflective or mirrored coating.

7. The cover of claim 1 which further comprises removal members.

8. The cover of claim 7 wherein the removal members are handles.

9. The cover of claim 1 which further comprises a pair of arms extending outwardly from the front end at or proximate the sides.

10. The cover of claim 1 wherein the front flange is angled downwardly at 40 degrees.

11. A cover for a roller grill assembly, the roller grill assembly having a housing comprising a main body having a front and a back, a length extending from the front to the back, and a pair of side walls having upper surfaces thereon, and a heating area comprising a plurality of spaced apart tubular members rotatably mounted within the housing at a vertical position beneath the upper surfaces of the side walls, the roller grill assembly allowing for food placed between adjacent tubular members to be heated, the cover comprising:

a body sized to extend over the tubular members and rest on the upper surfaces of the side walls, the body having a main section that extends over and conceals a portion of the heating area and a length less than the length of the housing, a front end, a rear end and a pair of sides;

a front flange extending and angling downwardly from the main section of the body at the front end, the front flange extending between the side walls of the housing and separating the heating area of the roller grill assembly into a front section that is visible from the front of the housing and a rear section that is substantially concealed from the front of the housing by the main section and the front flange;

a rear flange extending upwardly from the rear end of the body; and a pair of arms extending outwardly from the front end at or proximate the sides.

12. The cover of claim 11 wherein the rear flange comprises a first end and a second end and which further comprises rear flange side walls extending downwardly from the first and second end.

13. The cover of claim 11 wherein the cover is made from stainless steel.

14. The cover of claim 11 wherein the front flange includes a reflective or mirrored coating.

15. The cover of claim 11 which further comprises removal members.

16. The cover of claim 15 wherein the removal members are handles.

17. The cover of claim 1 wherein the front flange is angled downwardly at 40 degrees.

18. The cover of claim 1 wherein the body is substantially flat.

* * * * *